United States Patent
Maruyama (10) Patent No.: US 6,757,294 B1
(45) Date of Patent: Jun. 29, 2004

(54) SYSTEM AND METHOD FOR AMICABLE SMALL GROUP MULTICAST IN A PACKET-SWITCHED NETWORK

(75) Inventor: Kiyoshi Maruyama, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/524,409

(22) Filed: Mar. 13, 2000

(51) Int. Cl.⁷ .............................................. H04L 12/56
(52) U.S. Cl. ....................... 370/432; 370/393; 370/408
(58) Field of Search ................................ 370/401, 408, 370/428, 390, 432, 393, 402; 709/238, 250; 713/162

(56) References Cited

U.S. PATENT DOCUMENTS

| | | | |
|---|---|---|---|
| 5,361,256 A | * 11/1994 | Doeringer et al. | 370/390 |
| 5,517,494 A | * 5/1996 | Green | 370/408 |
| 5,555,244 A | * 9/1996 | Gupta et al. | 370/397 |
| 5,617,421 A | * 4/1997 | Chin et al. | 370/402 |
| 5,946,316 A | * 8/1999 | Chen et al. | 370/408 |
| 6,088,336 A | 7/2000 | Tosey | 370/408 |
| 6,347,090 B1 | * 2/2002 | Ooms et al. | 370/428 |
| 6,370,142 B1 | * 4/2002 | Pitcher et al. | 370/390 |
| 6,442,617 B1 | * 8/2002 | Lowe et al. | 709/250 |
| 6,466,343 B1 | 10/2002 | Lahat et al. | |
| 6,502,140 B1 | * 12/2002 | Boivie | 709/238 |
| 6,597,703 B1 | * 7/2003 | Li et al. | 370/428 |
| 6,600,743 B1 | * 7/2003 | Lee et al. | 370/390 |
| 6,606,706 B1 | * 8/2003 | Li | 713/162 |
| 2003/0165140 A1 | * 9/2003 | Tang et al. | 370/393 |

* cited by examiner

Primary Examiner—Salvatore Cangialosi
(74) Attorney, Agent, or Firm—Richard M. Ludwin, Esq.; McGinn & Gibb, PLLC (57) ABSTRACT

A method (and system) of creating a multicast packet by a source node in a world-wide network, includes providing each multicast packet with a predetermined indicator indicating that the packet includes a multicast packet, one of a plurality of multicast destinations being placed in a packet destination field and a list of remaining multicast destinations being provided in a packet header. A conventional router receiving a multicast packet handles it as a unicast packet and routes it in a conventional manner. A multicast-capable router receiving a multicast packet goes through a packet regeneration and routing process, creating multicast packets and/or unicast packets and then routing them using the conventional routing table. A destination node receiving a multicast packet goes through the packet regeneration and forwarding process, creating a multicast or unicast packet depending on the number of destinations in the received multicast packet and bouncing back the regenerated packet to the router to which the node is attached.

47 Claims, 6 Drawing Sheets

SYSTEM AND METHOD FOR AMICABLE SMALL GROUP MULTICAST IN A PACKET-SWITCHED NETWORK

CROSS-REFERENCE TO RELATED APPLICATIONS

The present application is related to U.S. patent application Ser. No. 09/524,416, filed on Mar. 13, 2000, to Boivie et al., entitled "METHOD AND SYSTEM FOR CREATING SMALL GROUP MULTICAST OVER AN EXISTING UNICAST PACKET NETWORK" having IBM Docket No. YO999-409, incorporated herein by reference.

BACKGROUND OF THE INVENTION

1. Field of the Invention

The present invention relates generally to a world-wide network (e.g., such as the global Internet), and more particularly to those Internet routing protocols for supporting multicast.

2. Description of the Related Art

The Internet is the world's largest network, and it has become essential to businesses as well as to consumers. The success of Internet is partly due to the simplicity of routing protocols used in the network for packet delivery.

There are basically three types of packets delivery mechanisms including "unicast" that allows the delivery of information from a source to a particular destination, "broadcast" that allows the delivery of information from a source to every destination in the network, and "multicast" that allows the delivery of information from a source to a selected group of destinations in the network.

Today, in the Internet, the multicast is supported by using routers called "Class D" routers. In this scheme, prior to conducting the multicast, necessary resources are reserved at those involved Class D routers. Then, multicast may be started. At the conclusion of the multicast, such reserved resources must be freed so that they become available for other multicasts.

Because of this reservation and resource allocation involvement, this Class D router-based multicast scheme is suitable for supporting long-lasting multicasts (e.g., minutes instead of seconds to minimize the overhead of reservation) that involve large numbers of destinations.

However, because of this reservation and resource allocation involvement, it is not suitable for supporting very large numbers of small group multicasts, due to reservation time and resource consumption at each Class D router to keep track of the state of each multicast.

Moreover, because each Class D router must create entries for each multicast group and this entry occupies a certain space, only a finite number of multicasts may be supported.

A way to support an extremely large number of small multicast groups is to let each packet carry routing destinations and alleviate routers from keeping track of states of individual multicast.

There are basically two distinctive methods to carry destinations for multicast purposes. A first method carries a list of multicast destinations and indicates that the packet is a multicast packet (e.g., namely indicating that a packet is not a unicast packet).

A second method is to carry multicast routing information (e.g., sometimes referred to as "source routing" or "routing tree") that includes the multicast destinations and indicates that the packet is a multicast packet.

The second approach has many drawbacks. For example, a source node must create a proper routing sub-tree that contains multicast destinations that is computation intensive, a routing tree description becomes a substantial overhead of each multicast packet, and a new multicast-enabled router must perform a fairly complex routing sub-trees regeneration process for every multicast packet received.

Therefore, desirable solutions for small group multicast are based on a multicast packet that carries a list of multicast destinations and simply indicates that the packet is a multicast packet delivery (e.g., this indicator allows a new multicast router to differentiate multicast packets easily from unicast packets).

In this approach, there are two distinctive Internet Protocol (IP) packet formats for small group multicast depending on how the IP destination address field is used for multicasting packets. Both formats have a control field bit (MC) indicating whether or not a given packet is a multicast (MC=1) or unicast (MC=0).

One type of multicast packet format is to place one of a plurality of multicast destination IP addresses into the IP packet destination field and the remainder of multicast destination IP addresses in the OPTIONS field of the IP packet.

Another type of multicast packet format is to choose a multicast-capable router (e.g., the router that supports the new multicast routing protocol) in the network and place its IP address into the IP packet destination field, and place all of the multicast destination IP addresses in the OPTIONS field. Each of these two formats offers a completely different implementation of routing algorithms and each gives pros and cons.

The present invention described in detail below claims an innovative multicast routing solution when the former multicast packet format has been used

SUMMARY OF THE INVENTION

In view of the foregoing and other disadvantages, drawbacks, and problems of the conventional methods and systems, an object of the present invention is to provide a multicast scheme and method that is suitable for simultaneously supporting a very large number of small group multicasts.

Another object of the present invention is to support gradual introduction of the new multicast-capable router(s) into the network without introducing any disruptions to on-going operations.

Yet another object of the present invention is to provide a scheme that improves resource utilization and multicast efficiency as the number of multicast-capable routers are introduced into the network and as the existing unicast routers are upgraded to the new multicast-capable routers.

Still another object of the present invention is to guarantee the delivery of a multicast packet even if there is no multicast-capable router in the network (thus amicable).

A further object of the present invention is to use an existing routing table for multicasting.

Yet another object of the present invention is to keep the functional requirement of the new multicast capable router to absolute minimum.

A still further object of the present invention is to make a new multicast-capable router completely transparent and independent from any existence or nonexistence of any other multicast-capable routers in the network.

Another object of the present invention is to allow simple swapping of the existing unicast routing protocol software with the new multicast-capable routing protocol software.

In a first aspect, a method (and system) of creating a multicast packet by a source node in world-wide network, includes providing each multicast packet with a predetermined indicator indicating the packet is a multicast packet, one of a plurality of multicast destinations being placed in the packet destination field and a list of remaining multicast destinations being provided in the packet header.

In a second aspect of the invention, a method of regenerating and routing packets by a multicast capable router in a world-wide network, includes for each destination, Dp, D1 through Dk, finding its next-node (NN) from a routing table, judging whether any of the destinations have the same next node (NN) as another destination, and for the destinations judged to have the same next-node (NN), generating a multicast packet.

In a third aspect of the invention, a method of regenerating a packet by a receiving destination node in a world-wide network, includes determining the number of remaining multicast destinations in the received packet, providing a packet with a predetermined indicator indicating the packet is a multicast when the remaining number of multicast destinations is more than one, or indicating the packet is a unicast packet when the remaining number of multicast destinations is one, one of the plurality of multicast destinations being placed in the packet destination field and a list of remaining multicast destinations being provided in the packet header, and forwarding the regenerated packet to the router from which the original packet was received.

Along with the above aspects, a programmable storage device is provided for storing a program of the methods of the present invention.

With the unique and unobvious features of the present invention, a system and method are provided for creating small group multicast network without disrupting the existing unicast network, and yet which provide guaranteed delivery of multicast packet to all destinations even if there is no new router capable of supporting multicasting in the network.

The present invention described in detail below claims an innovative multicast routing solution when the above-mentioned former multicast packet format has been used (e.g., placing one of the plurality of multicast destination IP addresses into the IP destination field and the remainder of such addresses in the OPTIONS field of the IP packet).

The Internet IP packet which supports this former multicast packet format may appear as the following: in addition to other fields of the Internet IP packet, it has a PROTOCOL field indicating that the packet is a small group multicast, the Source IP address representing the source of the multicast packet, the Destination IP Address representing one of small group multicast destination addresses, and the OPTIONS field. This OPTIONS field contains CODE indicating small group multicast, contains LENGTH indicating the total number of bytes for small group multicast destinations (e.g., equivalent to the number of multicast destinations minus one which is already included in the Destination IP Address field), contains POINTER indicating the start position of multicast destinations, and followed by the IP addresses of the remaining small group multicast destinations (e.g., n−1, where n is the total number of small group multicast destinations).

With the unique and unobvious features of the present invention, a system and method are provided for creating small group multicast network without disrupting the existing unicast network, and yet which provide guaranteed delivery of multicast packet to all destinations even if there is no new router capable of supporting multicasting in the network.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Referring now to the drawings, and more particularly to FIGS. 1–7, there are shown preferred embodiments of the method and structures according to the present invention.

PREFERRED EMBODIMENT

Generally, the present invention provides a system and method for creating small group multicast network without disrupting the existing unicast network, and yet which provide guaranteed delivery of multicast packet to all destinations even if there is no new router capable of supporting multi casting in the network.

The present invention assumes that each multicast packet has an indicator indicating that the packet is a multicast packet (i.e., MC=1), one of the multicast destination(s) is placed in the packet destination field and carries a list of remaining multicast destinations in the packet header. Any packet with MC=0 is judged as a unicast packet, and therefore its destination field carries the packet destination itself.

In the invention, a multicast packet (MC=1) is denoted by (S, Dp, 1(D1,D2, . . . ,Dk)) as shown below in Table 1 where:

TABLE 1

| Symbol | Description |
| --- | --- |
| S | The packet source (origin) node address |
| Dp | One of multicast destinations. This is referred to as the primary destination. |
| (D1, D2,, Dk) | The remainder of destinations. Thus a packet has (k + 1) multicast destinations, Dp, D1, . . . , Dk. |
| 1 (MC) | 1 indicates that the packet is multicast, while 0 indicates that the packet is unicast. When k = 0, the MC indicator is set to 0. |

A packet that travels in a packet switched network such as the Internet carries, in addition to the above information, many other fields for routing and control and the payload. The present invention uses a conventional routing table illustrated below in Table 2:

TABLE 2

| Destination | Next-Node | Distance to Destination |
|---|---|---|
| D | NN | d(D) |

The conventional routing table informs, for each destination D, to which next node a packet should be routed to in order for the packet to eventually reach the destination D. The routing table is updated by a conventional routing table updating process.

A source node (S) of a multicast packet is responsible for creating a multicast packet of the form (S, Dp, 1(D1, D2, . . . ,Dk)) where Dp is one of the multicast destination(s) and D1 through Dk are the remaining k destinations (the total of k+1 multicast destinations). Dp is referred to as the "primary destination of the multicast packet".

To select the primary destination, the source node S may randomly choose one destination from k+1 destinations, and set the selected destination as the primary destination Dp of the multicast packet. Another method of selecting one destination as the primary destination Dp is to consider the known distance from the source node S to all the multicast destinations and choose the one nearest to the source node.

When a conventional router (e.g., not a multicast-capable router) has received a multicast packet, since it has no capability of knowing that the received packet is a multicast packet, it simply routes the packet to its destination Dp by referencing the conventional routing table.

When a packet has been received by a multicast-capable router, Rmc, it first checks whether or not the packet is a multicast packet (i.e., MC=1). If MC=0, then the router handles the packet as a unicast packet and routes it.

If MC=1, then the packet is handed over to a "packet regeneration" process. This process creates multicast and/or unicast packets with appropriate destinations and hands them back to the conventional routing process. The conventional routing process then routes the regenerated packets as if the packets were unicast packets by referencing the conventional routing table.

When a packet arrives at a destination node D, D first determines (e.g., ensures) that Dp=D, and then checks if the packet is a unicast packet or a multicast packet. If the received packet is a unicast packet (i.e., MC=0), D takes no further routing action.

If the received packet is a multicast packet (i.e., MC=1), D performs a packet "regeneration and forwarding" process. The packet regeneration process involves the creation of a packet with one of k destinations as the primary destination and eliminating the selected destination from the list of k destinations to create a list of k−1 destinations. The forwarding process involves the sending of the regenerated packet to any router to which the destination node D attaches.

The multicast packet source node S (i.e., edge node) is responsible for creating the multicast packet of form (S, Dp, 1(D1,D2, . . . ,Dk)) for k+1 multicast destinations Dp, D1, D2, . . . ,Dk. The source node S may choose any one of k+1 destinations as the primary destination Dp using any selection criteria depending upon the designer's constraints and requirements, including random selection, the nearest destination selection, etc. Each edge node may send a PING to destinations of its interest and record the PING elapsed time as the measure of distance, or may send "traceroute" to each destination and record the hop counts as the measure of distance.

Each conventional router handles every packet, including multicast packets, as unicast packets, and routes the packets by referencing the conventional routing table.

Each multicast-capable router has, in addition to the conventional routing capability, a special capability to handle each multicast packet in a process called a "packet regeneration and routing" process.

Figure 1:
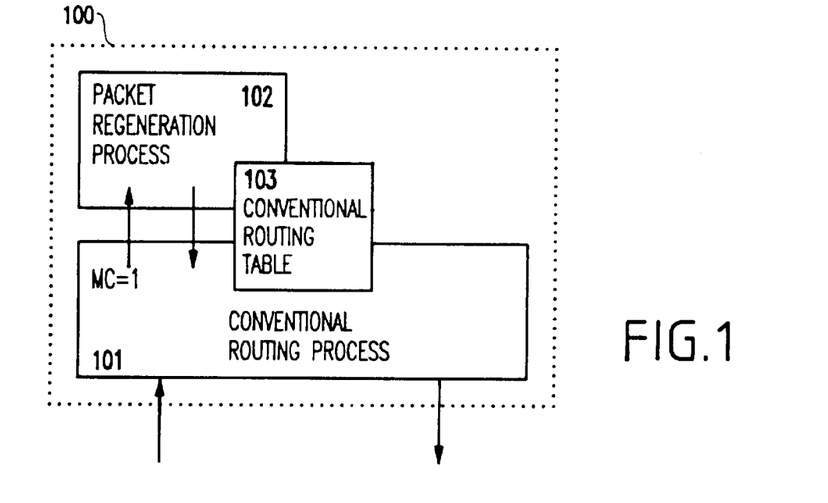
FIG. 1 illustrates a routing system of a multicast router according to the present invention.

FIG. 1 illustrates the routing system 100 for use with the inventive multicasting system. Routing system 100 includes a conventional routing process 101 for updating the next-node (NN) column of the routing table, and also for routing unicast packets by referencing the NN column of the routing table. Further, a packet regeneration process 102 is included for referencing the Next-Node column in a conventional routing table 103 (also illustrated in Table 1 above) and creates appropriate copies of unicast and/or multicast packets.

When a packet is received at a multicast-capable router, the router first checks if the packet is a multicast (MC=1) or unicast (MC=0) packet. A packet with MC=0 (e.g., a unicast packet) is handled by the conventional routing process 101. A packet with MC=1 is handed over to the packet regeneration process 102 for special handling.

Packet Regeneration Process

Figure 2:
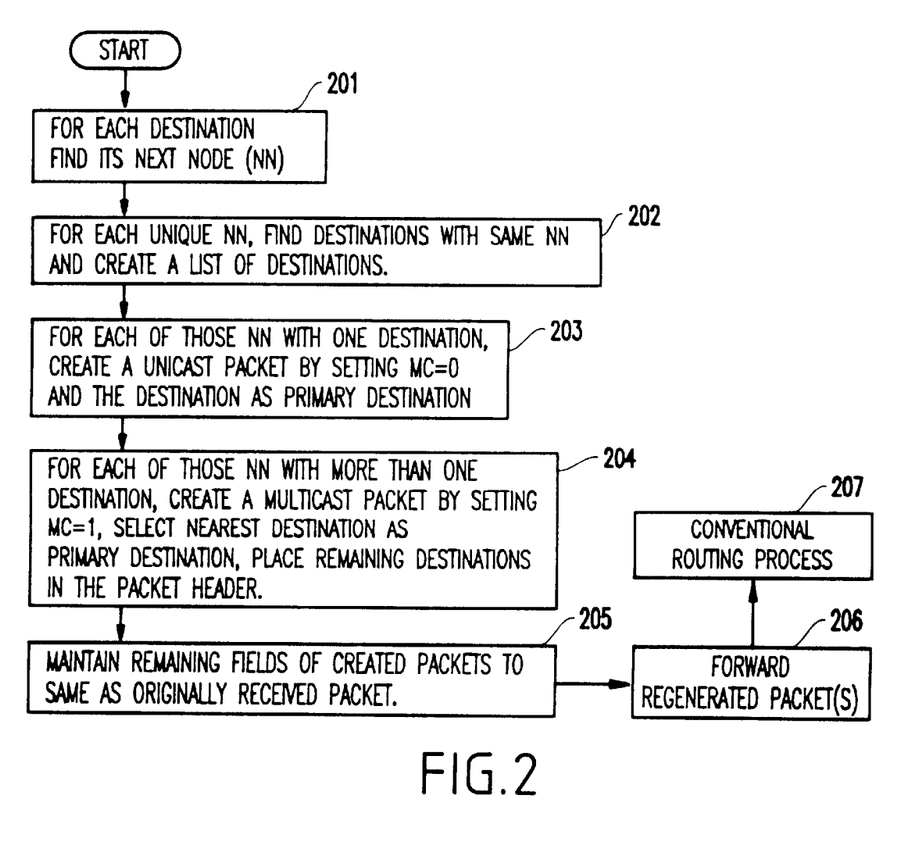
FIG. 2 is a flowchart of a packet regeneration and forwarding process 102 according to the present invention.

The packet regeneration process 102 processes a packet (S,Dp,1(D1,D2, . . . ,Dk)) as described below with reference to FIG. 2.

That is, in step 201, for each destination, Dp, D1 through Dk, find its next-node (NN) from the conventional routing table.

In step 202, for each unique NN found in step 201, those destinations with the same NN are found and a list of such destinations is created.

In step 203, for each of those NN that has a list of one destination found in step 202, a unicast packet is created with MC=0 and the destination as the primary destination of the unicast packet.

In step 204, for each of those NN that has a list of more than one destination found in step 202, a multicast packet is created with MC=1, a nearest destination is selected as the primary destination of the multicast packet, and the remaining destinations in the list are placed into the multicast packet header.

In step 205, for each of those packets created in step 203 or step 204, the rest of the fields in the packet are kept the same as the originally received packet.

Finally, in step 206, the regenerated packets are handed over (forwarded) to the conventional routing process 207 (e.g., same as 101 shown in FIG. 1) for conventional routing.

Figure 3:
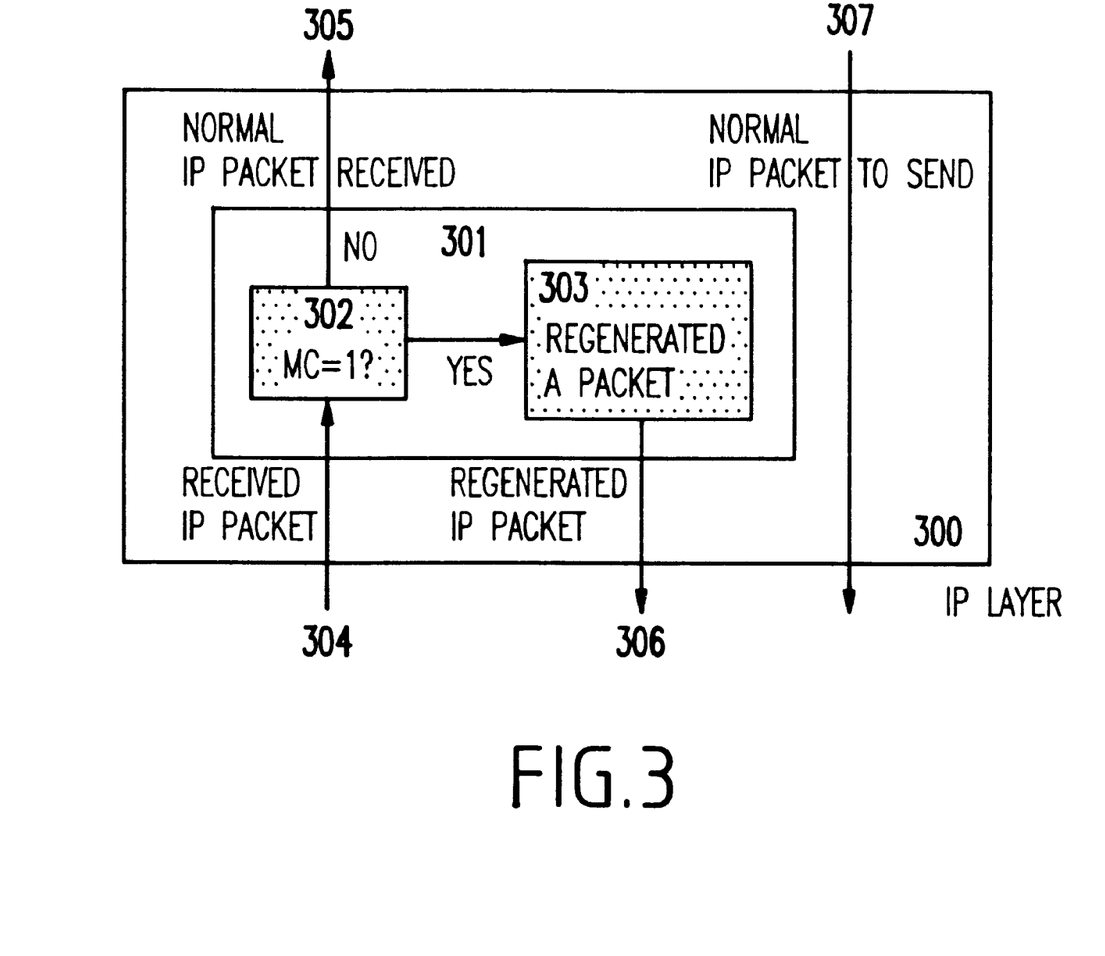
FIG. 3 illustrates a flow of the packet regeneration process at a packet destination node.

Referring to FIG. 3, the new functions at each multicast destination node for the amicable multicast process according to the invention, are shown. The new functions are collectively referred to as "packet regeneration and forwarding" (e.g., shown at reference numeral 301) and are enhancements to the Internet Protocol (IP) layer 300.

When a destination node D receives a multicast packet (e.g., shown at reference numeral 304) of the form (S,Dp, 1(D1,D2, . . . ,Dk)), the node D first determines (ensures) that Dp is itself, i.e., Dp=D. Otherwise, the packet has been erroneously routed. This check is a part of a typical, conventional IP layer. Then, the node D checks to determine whether MC=1 (e.g., whether the packet is a multicast packet) or not (e.g., shown at reference numeral 302).

If MC=0 (e.g., the packet is a unicast packet), then it takes no further action in the "regeneration and forwarding" process (e.g., shown at reference numeral 305).

If MC=1, then the node D performs the following regeneration and forwarding process (e.g., shown at reference numeral 303).

That is, a multicast packet is created by: (a) setting S as the packet source address; (b) selecting one destination (e.g., selecting the nearest one if possible; otherwise, selecting one randomly) from destinations D1 through Dk and naming it as the primary destination of the packet; (c) set MC=1 if k>1; otherwise MC=0; (d) attaching the list of remaining k−1 destinations; and (e) setting the remaining fields the same as those of the originally received packet. It is noted that a conventional routing calculation algorithm may be employed in finding the "nearest" destination in (b) above.

Then, the regenerated packet is forwarded to any router attached thereto (e.g., shown at reference numeral 306). Any conventional unicast IP packets to be sent (e.g., shown at reference numeral 307) are handled by the IP layer 300 in a conventional manner.

FIGS. 4–7 provide examples illustrating exemplary operations of the amicable multicast process according to the invention, using a network topology with packet routers numbered R1–R12, and edge nodes labeled A–H. In FIGS. 4–7, packet routers with the "dark" background represent multicast-capable routers. It is also assumed that each of the edge nodes has the packet "regeneration and forwarding" capability.

Figure 4:
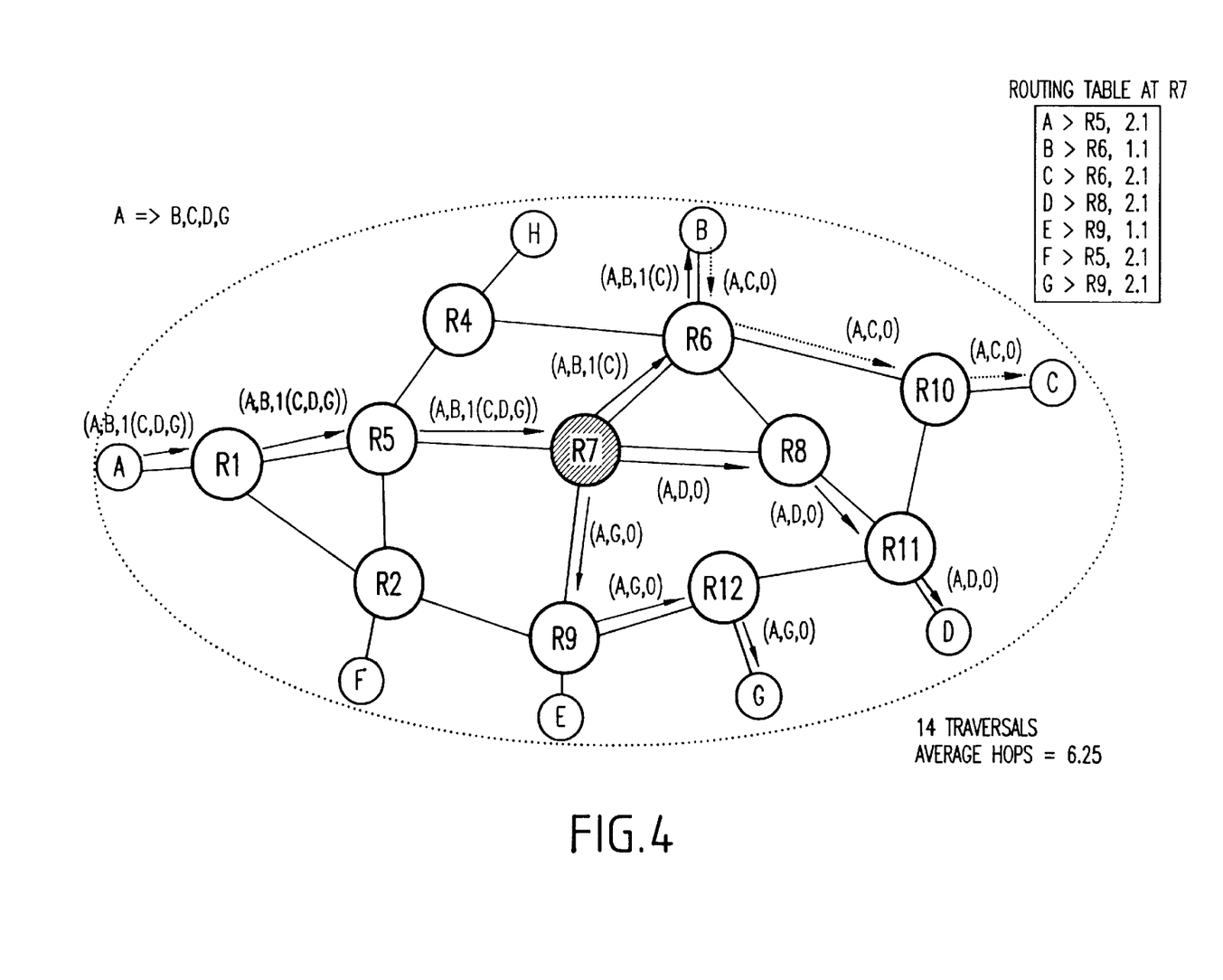
FIG. 4 illustrates a first exemplary amicable multicast routing process.

Turning now to FIG. 4, it is assumed that the packet router R7 is the only router that is multicast-capable and the rest of the routers are conventional (e.g., unicast) routers. The conventional routing table at R7 is also illustrated in which each row gives destination, next-node and the expected distance to the destination from the router.

In this example, the edge node A sends a multicast packet to destinations B, C, D and G. For illustrative purposes, it is assumed that the edge node A has a means to determine which destination is nearest to the node A and that node B is the nearest destination (e.g., using the above-mentioned conventional routing calculation algorithm or the like). The edge node A then creates a multicast packet of form (A,B,1(C,D,G)) and sends the multicast packet to router R1.

Since R1 is a conventional packet router, it looks at the packet destination B and by referencing its routing table, R1 sends the packet to router R5. R5 then looks at its routing table and forward the packet to router R7.

It is noted that routers R1 and R5 (e.g., conventional routers) handle the multicast packet as if the packet were an ordinary unicast packet. Since Router R7 is a multicast-capable router, it first checks the MC value. Since MC=1, it then performs the packet "regeneration and routing" process described above.

That is, router R7 first finds the "next-node" for destinations B, C, D and G. Since the "next-node" for destinations B and C are the same (i.e., router R6), and the distance between R7 and destination B is shorter than the distance between R7 and C, R7 creates a packet of form (A,B,1(C)). For the destination D, R7 creates a packet of form (A,D,0) and for the destination G, router R7 creates a packet of form (A,G,0). Router R6 receives the packet (A,B,1(C)) from R7. Since R6 is a conventional router, it simply routes the packet to node B. The edge node B receives the packet of form (A,B,1(C)) and recognizes that MC=1 (e.g., representing that the packet must be forwarded so that other destinations can receive the payload).

After node B receives (A,B,1(C)), B then performs the "regeneration and forwarding" process. Node B creates a packet of form (A,C,0) and then sends the packet to router R6. R6 then routes the packet to R10 which then routes the packet to C. Thus, the manner in which the packets (A,D,0) and (A,G,0) are routed through the network is believed to be evident from the above.

In the above example, there are fourteen (14) link "traversals" of packets to deliver a multicast packet (A,B,1(D,D,G)), and the average hop count (i.e., the average of hop counts from A to B, C, D and G) is 6.25. These two measures indicate some level of multicast routing efficiency. It is important to note that the edge node B performs the regeneration and forwarding functions. If the packet received by B had many other destinations attached thereto, B chooses the one which is nearest to B and makes such a "nearest" destination node as the packet's primary destination.

Figure 5:
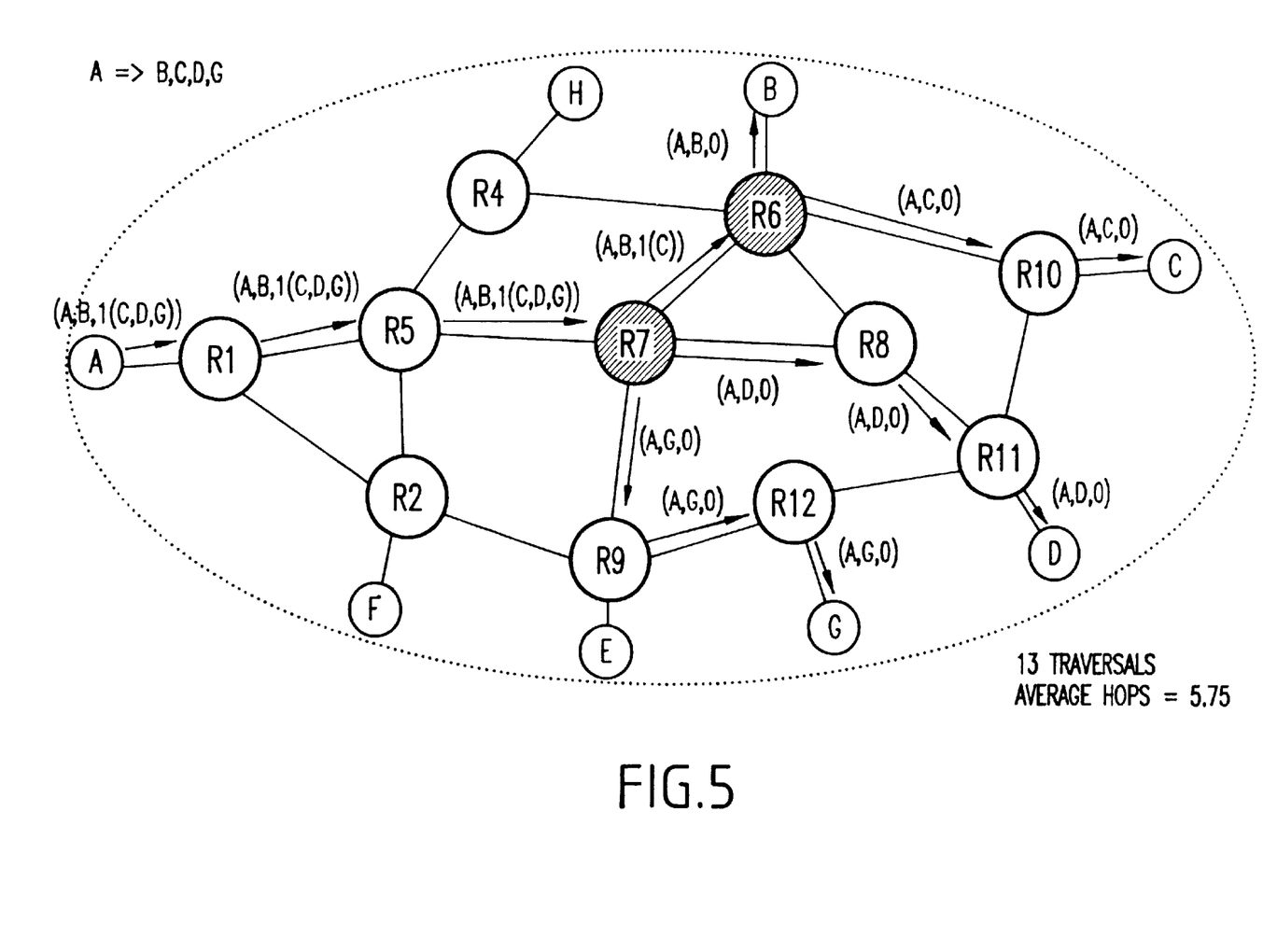
FIG. 5 illustrates a second exemplary amicable multicast routing process.

FIG. 5 assumes exactly the same as scenario as FIG. 4, except that the router R6 is now multicast-capable in addition to router R7. The packet of form (A,B,1(C)) arriving at router R6 from R7 will be regenerated and routed. Router R6 creates two packets, (A,B,0) and (A,C,0), routes (A,B,0) to B and routes (A,C,0) to router R10. In this example, the multicast packet traverses thirteen (13) links, and the average hop count is 5.75. Compared to the example in FIG. 4, the example of FIG. 5 has one less traversal and the average hop count has been improved by 0.5.

Figure 6:
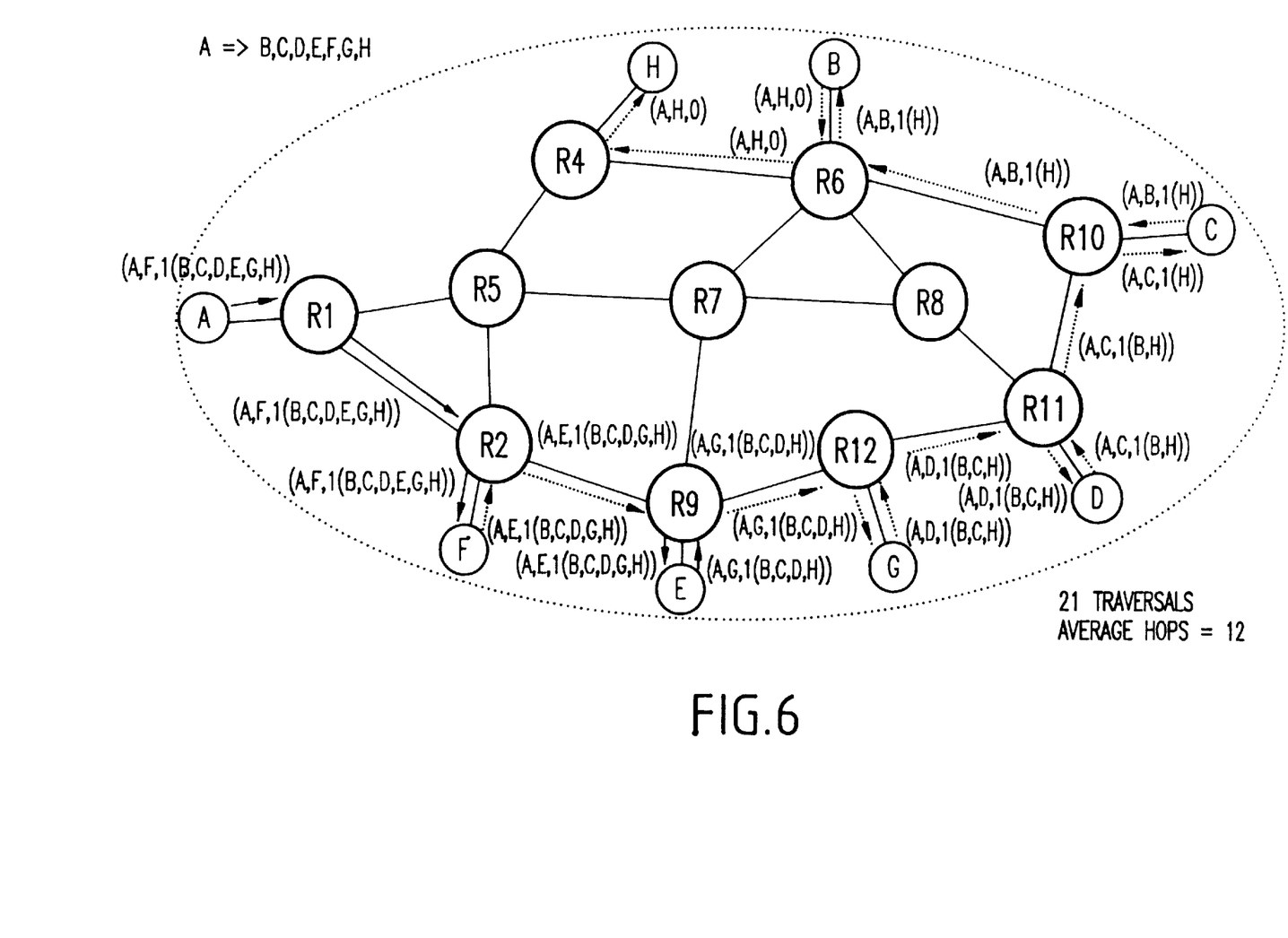
FIG. 6 illustrates a third exemplary amicable multicast routing process.

FIG. 6 assumes that each and every packet router is conventional (e.g., none is multicast-capable) and shows that the amicable multicast still works in this extreme environment. Of course, if the origin node A had the knowledge that there is no multicast function-capable router in the network, the origin node may choose to use multiple unicast (e.g., a unicast packet to each destination) instead of the following amicable multicast.

In this example, it is assumed that the edge node A sends a multicast packet to destinations B–H. Assuming A can determine which destination is the nearest thereto, A selects destination F as the primary destination of the multicast packet. Node A generates a packet of form (A,F,1(B,C,D,E,G,H)) and sends it to router R1. Router R1 then routes the packet to router R2. Router R2 then routes the packet to F, the primary destination. F receives the packet and then realizes that MC=1 and invokes the packet regeneration and forwarding process.

Assuming F has either the knowledge of which destination among B, C, D, E, G, and H is the nearest one or has the capability to determine which destination is the nearest one using any means to measure the distance such as PING or "traceroute", F picks destination E as the nearest one, creates a packet of form (A,E,5(B,C,D,G,H)) and sends the packet to router R2. Router R2 then routes the packet to R9, and so forth. Eventually, the packet will be delivered to remaining destinations.

In the above example of FIG. 6, the packet traverses 21 links and the average hop count is 12. As for a comparison, had the edge node chosen to use the unicast to each destination to achieve the "multicast" equivalence, the total link traversals would be 33 and the average hop count would be 4.7. Thus, as is evident, the twelve unicast use a substantially more network resources while giving a substantially better delay.

Figure 7:
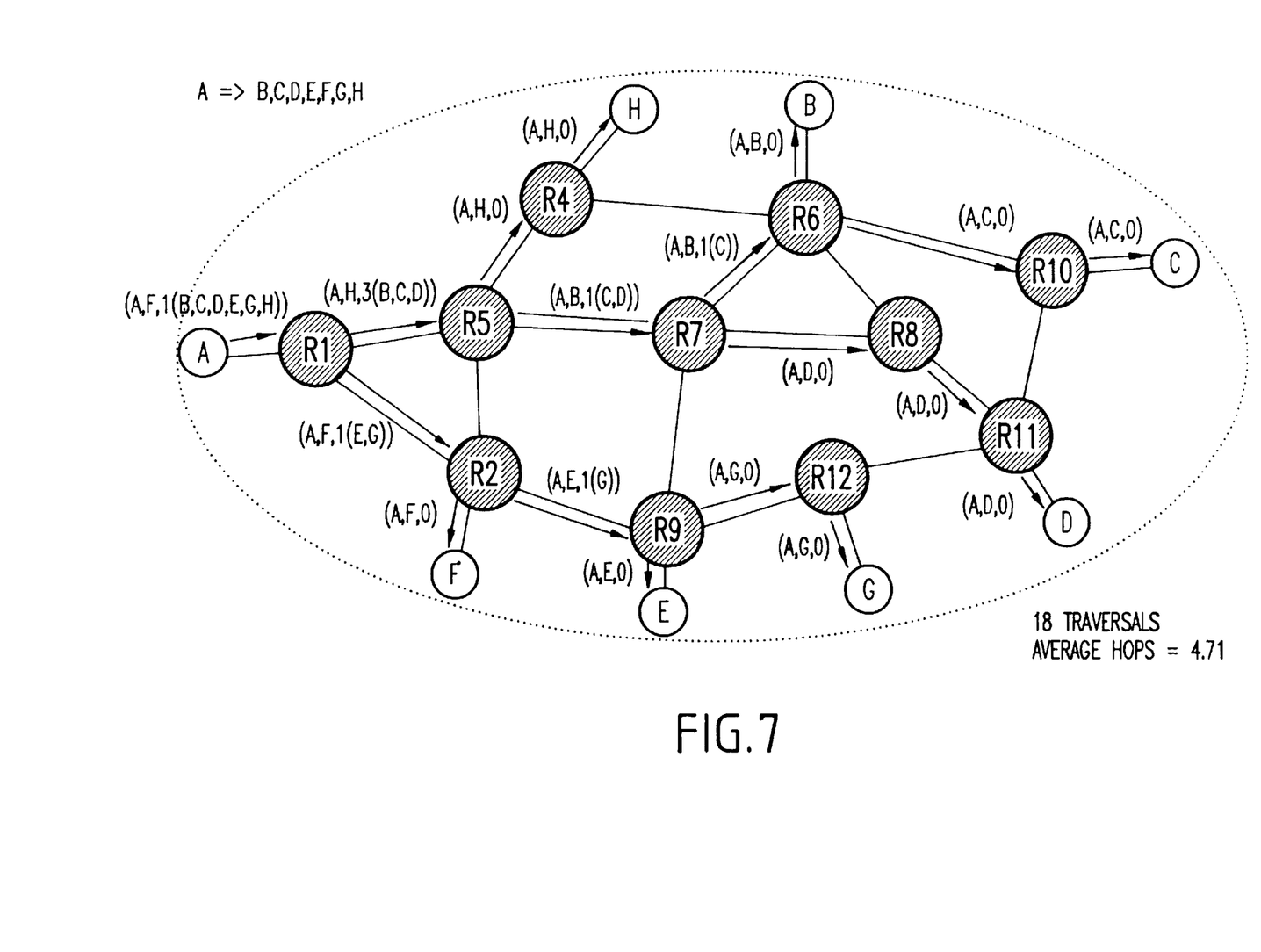
FIG. 7 illustrates a fourth exemplary amicable multicast routing process.

FIG. 7 assumes the exactly the same environment as that in FIG. 6. However, in FIG. 7, every packet router, R1 through R12, is multicast-capable (i.e., another extreme example). In this case, the total link traversals is 18, and the average hop count is 4.7. Because all routers are multicast function-capable, the average hop count is the same as that of the twelve unicast case. However, because all of the routers are multicast-capable, the system achieves the absolute minimum link traversals.

In addition to the hardware and process environment described above, a different aspect of the invention includes a computer-implemented method according to the present invention, as described above, for amicable small group multicast in a packet-switched network. For example, this method may be implemented in the particular hardware environment discussed above with regard to FIG. 1.

Such a method may be implemented, for example, by operating a CPU to execute a sequence of machine-readable instructions. These instructions may reside in various types of signal-bearing media (magnetic, optical, etc.).

Thus, the present invention, taking a packet format as an assumption, provides a new method and system for routing packets based on the packet format and for creating information for routing. Further, the invention provides a packet destination node with a packet regeneration and forwarding capability. With the invention, one of a plurality of destinations is selected by the destination node (router) as a primary destination Dp of the multicast packet. Further, the invention is advantageous since conventional packet routers and the new multicast capable packet router can coexist in a network without any differentiation. The inventive routing-scheme is operable regardless of whether there are any new packet routers or not in the network. That is, the network does not require any multicast-capable routers. Indeed, the sender need not know whether a multicast-capable router even exists in the network.

Additionally, in the invention, the multicast packet format is a very simple reuse of the existing unicast packet's option field, and requires no change in the existing unicast packet format.

While the invention has been described in terms of several preferred embodiments, those skilled in the art will recognize that the invention can be practiced with modification within the spirit and scope of the appended claims.

What is claimed is:

1. A method of creating a multicast packet by a source node in a world-wide network, comprising:
   providing each multicast packet with a predetermined indicator indicating that the packet comprises a multicast packet,
   one of a plurality of multicast destinations being placed in a packet destination field and a list of remaining multicast destinations being provided in a packet header.

2. The method according to claim 1, wherein any packet judged not to have said predetermined indicator is judged to be a unicast packet having a destination field carrying the packet destination itself.

3. The method according to claim 1, wherein said multicast packet is denoted by (S, Dp, 1(D1,D2, . . . ,Dk)) where S is the source node, Dp is a packet primary destination, and D1 through Dk are multicast destinations.

4. The method according to claim 1, wherein a routing table informs, for each destination D, to which next node a packet is to be routed to allow said packet to eventually reach the destination D.

5. The method according to claim 1, wherein said source node (S) creates said multicast packet having a form (S, Dp, 1(D1,D2, . . . ,Dk)) where Dp is one of the multicast destinations and D1 through Dk are the remaining k destinations such that there are k+1 multicast destinations in total and wherein Dp is a primary destination of the multicast packet.

6. The method according to claim 5, wherein the source node S randomly chooses one destination from the k+1 destinations, and sets the selected destination as the primary destination Dp of the multicast packet.

7. The method according to claim 1, further comprising:
   judging a distance from the source node to all of the plurality of multicast destinations, and selecting a destination which is judged to be nearest to the source node.

8. The method according to claim 1, wherein when a conventional router, other than a multicast-capable router, has received a multicast packet, said router routes the packet to its destination Dp by referring to a routing table.

9. The method according to claim 1, further comprising:
   when a packet has been received by a multicast-capable router, Rmc, judging whether or not the packet comprises a multicast packet.

10. The method according to claim 9, wherein if the packet is not judged to comprise a multicast packet, then the router processes and routes the packet as a unicast packet.

11. The method according to claim 1, further comprising:
   if the packet is judged to comprise a multicast packet, then forwarding said packet to a packet regeneration process for creating multicast and/or unicast packets with selected destinations and forwarding the packets to a predetermined routing process, said predetermined routing process routing the regenerated packets as if the packets were unicast packets by referencing the routing table.

12. The method according to claim 1, further comprising:
   when a packet arrives at a destination node D, said destination node D determines whether a primary destination node Dp is equal to destination node D, and checks whether the packet comprises a unicast packet or a multicast packet.

13. The method according to claim 12, wherein if the received packet is judged to comprise a unicast packet, no further routing of the packet occurs.

14. The method according to claim 12, wherein if the received packet is judged to comprise a multicast packet, then the destination D performs a packet regeneration and forwarding process.

15. The method according to claim 14, wherein said packet regeneration process comprises creating a packet with one of k destinations as the primary destination and eliminating the primary destination from the list of k destinations to create a list of k–1 destinations.

16. The method according to claim 15, wherein the forwarding process includes sending the regenerated packet to any router to which the destination node attaches.

17. The method according to claim 1, wherein when a packet is received at a multicast-capable router, the router judges whether the packet comprises a multicast or unicast packet, wherein if said packet is judged to comprise the unicast packet, then said unicast packet is routed.

18. The method according to claim 17, wherein if the packet is judged to comprise a multicast packet, then the multicast packet is forwarded to a packet regeneration process.

19. The method according to claim 18, wherein said packet regeneration process processes a packet (S,Dp,1(D1, D2, . . . ,Dk)) such that for each destination, Dp, D1 through Dk, find its next-node (NN) from a routing table.

20. The method according to claim 19, further comprising:
   for destinations judged to have the same next-node (NN), generating a multicast packet.

21. The method according to claim 20, wherein said generating of said multicast packet comprises one of setting MC=1 if the number of destinations is more than one, and setting MC=0 if the number of destinations is no more than one.

22. The method according to claim 21, further comprising:
selecting a nearest destination as a packet primary destination; and
maintaining remaining fields in the packet the same as the originally received packet.

23. The method according to claim 21, further comprising:
selecting a random destination as a packet primary destination; and
maintaining remaining fields in the packet the same as the originally received packet.

24. The method according to claim 22, further comprising:
forwarding the regenerated packet to the predetermined routing process for routing.

25. The method according to claim 23, further comprising:
forwarding the regenerated packet to the predetermined routing process for routing.

26. The method according to claim 1, each multicast destination node includes, packet regeneration and forwarding capability.

27. The method according to claim 1, wherein when a destination node D receives a multicast packet of the form (S,Dp,1(D1,D2, . . . ,Dk)), node D judges whether Dp is equal to D, and then checks to determine whether the packet comprises a multicast packet.

28. The method according to claim 27, wherein if the packet comprises a unicast packet, then the processing terminates.

29. The method according to claim 28, wherein if the packet comprises a multicast packet, then the node D performs a regeneration and forwarding process.

30. The method according to claim 29, wherein said regeneration and forwarding process comprises:
creating a multicast packet by setting source node S as the packet source address, selecting one destination from destinations D1 through Dk as the primary destination of the packet, one of setting MC=1 if the number of destinations is greater than 1 and setting MC=0 if the number of destinations is no more than 1, attaching a list of remaining k−1 destinations, and setting remaining fields of said packet to be regenerated the same as those of the originally received packet.

31. The method according to claim 30, further comprising forwarding the regenerated packet to a router attached thereto.

32. A method of regenerating and routing a packet by a multicast capable router in a world-wide network, comprising:
receiving a multicast packet of the form (S,Dp,1(D1, D2, . . . ,Dk)), where S denotes a source node, Dp denotes a primary destination, D1,D2, . . . ,Dk denotes a remainder of destinations, and "1" denotes that the packet is multicast:
for each destination, Dp, D1 through Dk, finding its next-node (NN) from a routing table;
judging whether any one of the destinations have the same next node (NN) as another destination; and
for the destinations judged to have the same next-node (NN), generating a multicast packet.

33. The method according to claim 32, wherein said generating of a multicast packet comprises:
determining whether a number of destinations with the same NN is greater than 1;
if the number of destination is judged to be greater than 1, then setting said indicator MC to 1 and selecting one of the destinations as a packet primary destination;
maintaining remaining fields in the packet to be regenerated the same as the originally received packet; and
forwarding the regenerated packet to the predetermined routing process.

34. The method according to claim 33, wherein if no destinations share a same NN, then MC is set to 0 and the packet is routed to the predetermined routing process.

35. The method according to claim 32, wherein if none of the destinations has the same next node (NM) as another destination, then a unicast packet is created for each destination and processed in a predetermined manner.

36. A method of handling, by a destination node in a world-wide network, each received multicast packet, comprising:
when a packet arrives at said destination node D, said destination node determining whether a primary destination node Dp is equal to the destination node D, and determining whether the packet comprises a unicast packet or a multicast packet; and
if the received packet is judged to comprise a multicast packet, performing, by said destination D, a packet regeneration and forwarding process,
wherein said packet regeneration process comprises:
creating a packet with one of k destinations as the primary destination and eliminating the primary destination from the list of k destinations to create a list of k−1 destinations; and
sending the regenerated packet to any router to which the regenerated packet attaches.

37. The method according to claim 36, wherein said packet regeneration process creates a new packet from the received packet (S,Dp,1(D1,D2, . . . ,Dk)) such that one destination from D1 through Dk is selected as a primary destination and is placed into the packet destination field.

38. The method according to claim 37, wherein said generating of said multicast packet comprises one of setting MC=1 if the number of destinations is more than one, and setting MC=0 if the number of destinations is no more than one.

39. The method according to claim 38, further comprising:
selecting a nearest destination as the packet primary destination;
removing the selected destination from the list of destinations; and
maintaining remaining fields in the regenerated packet the same as the originally received packet.

40. The method according to claim 38, further comprising:
selecting a random destination as the packet primary destination;
removing the selected destination from the list of destinations; and
maintaining remaining fields in the regenerated packet the same as the originally received packet.

41. The method according to claim 40, further comprising forwarding the regenerated packet to the router to which it is attached.

42. The method according to claim 36, wherein said regeneration and forwarding process comprises:

creating a packet by setting source node S as a packet source address, selecting one destination from destinations D1 through Dk as the primary destination of the packet, setting MC=1 if the number of destinations is greater than 1 and setting MC=0 if the number of destinations is no more than 1, attaching a list of remaining k−1 destinations, and setting remaining fields of the regenerated the same as those of the originally received packet.

43. A method of regenerating a packet by a receiving destination node in a world-wide network, comprises:

determining a number of remaining multicast destinations in the received packet;

providing a packet with a predetermined indicator indicating the packet comprises a multicast when the remaining number of multicast destinations is more than one, or indicating the packet comprises a unicast packet when the remaining number of multicast destinations is one, one of the plurality of multicast destinations being placed in the packet destination field and a list of remaining multicast destinations being provided in the packet header; and forwarding the regenerated packet to the router from which the original packet was received.

44. A programmable storage medium tangibly embodying a program of machine-readable instructions executable by a digital processing apparatus to perform a method of creating a multicast packet by a source node in a world-wide network, the method comprising:

providing each multicast packet with a predetermined indicator indicating that the packet comprises a multicast packet, one of a plurality of multicast destinations being placed in a packet destination field and a list of remaining multicast destinations being provided in a packet header.

45. A programmable storage medium tangibly embodying a program of machine-readable instructions executable by a digital processing apparatus to perform a method of regenerating and routing a packet by a multicast capable router in a world-wide network, comprising:

for each destination, Dp, D1 through Dk, finding its next-node (NN) from a routing table;

judging whether any one of the destinations have the same next node (NN) as another destination; and for the destinations judged to have the same next-node (NN), generating a multicast packet having a predetermined indicator indicating that the packet comprises a multicast packet.

46. A programmable storage medium tangibly embodying a program of machine-readable instructions executable by a digital processing apparatus to perform a method of handling, by a destination node in a world-wide network, each received multicast packet, said method comprising:

when a packet arrives at said destination node D, said destination node determining whether a primary destination node Dp is equal to the destination node D, and determining whether the packet comprises a unicast packet or a multicast packet; and if the received packet is judged to comprise a multicast packet, performing, by said destination D, a packet regeneration and forwarding process, wherein said packet regeneration process comprises:

creating a packet with one of k destinations as the primary destination and eliminating the primary destination from the list of k destinations to create a list of k−1 destinations; and sending the regenerated packet to any router to which the regenerated packet attaches.

47. A programmable storage medium tangibly embodying a program of machine-readable instructions executable by a digital processing apparatus to perform a method of regenerating a packet by a receiving destination node in a world-wide network, said method comprising:

determining a number of remaining multicast destinations in the received packet;

providing a packet with a predetermined indicator indicating the packet comprises a multicast when the remaining number of multicast destinations is more than one, or indicating the packet comprises a unicast packet when the remaining number of multicast destinations is one, one of the plurality of multicast destinations being placed in the packet destination field and a list of remaining multicast destinations being provided in the packet header; and forwarding the regenerated packet to the router from which the original packet was received.

* * * * *